Dec. 29, 1964 R. A. BLOOMSBURGH ETAL 3,163,794

DEFLECTION YOKE WITH SEPARABLE PORTIONS FOR CRT WITH CONSTRICTED NECK

Filed June 20, 1960 2 Sheets-Sheet 1

INVENTORS
RALPH A. BLOOMSBURGH
WILSON P. BOOTHROYD
ROBERT C. MOORE

BY Robert D. Sanborn
ATTORNEY

INVENTORS
RALPH A. BLOOMSBURGH
WILSON P. BOOTHROYD
ROBERT C. MOORE
BY
Robert D. Sanborn
ATTORNEY United States Patent Office 3,163,794

Patented Dec. 29, 1964

3,163,794

DEFLECTION YOKE WITH SEPARABLE PORTIONS FOR CRT WITH CONSTRICTED NECK

Ralph A. Bloomsburgh, Lafayette Hill, and Wilson P. Boothroyd and Robert C. Moore, Huntingdon Valley, Pa., assignors, by mesne assignments, to Philco Corporation, Philadelphia, Pa., a corporation of Delaware Filed June 20, 1960, Ser. No. 37,447
9 Claims. (Cl. 313—76)

The present inventon relates to improvements in cathode-ray tube display systems and more particularly to improvements in television picture tubes and beam deflection means therefor.

The trend in the design of television systems is to reduce as much as possible the depth of the cabinet required to house such systems without decreasing the size of the viewing screen. Usually the limiting factor in such designs is the length of the cathode-ray picture tube. Therefore it is desirable that the overall length of the cathode-ray tube be made as short as possible without decreasing the screen size. A convenient figure of merit for a television picture tube is the ratio of overall length to screen diagonal. The most compact tubes now known in the art have a length to screen diagonal ratio in the range 0.60 to 0.65. It would be highly desirable to provide a television picture tube in which this ratio is 0.50 or less.

Present television picture tubes require a relatively large amount of deflection power. A decrease in the deflection power requirements would permit the circuits associated with the picture tube to be made smaller and lighter. This is desirable from the standpoint of customer acceptance of the product and may be required by the smaller space available for the deflection circuits in compact cabinets tailored to fit shorter picture tubes. Various techniques for increasing the deflection sensitivity are known in the art. For example, it has been proposed that the neck of the cathode-ray tube be constricted over a substantial portion of its length so that the deflection coils may be placed as close as possible to the electron beam. The use of this technique usually tends to lengthen rather than shorten the neck portion of the cathode-ray tube. Along the same lines but as a separate and distinct technique, it has been proposed to form the flare of the cathode-ray tube so that the interior surfaces thereof lie parallel to the deflected path of the beam. Also, various proposals have been made for modifying the electron gun structure to make it shorter and to permit its placement in close proximity to the deflection yoke.

However, despite the availability of these various separate teachings in the art and the great demand in the art for a picture tube having a very low length to screen diagonal ratio by practically all of the major television set manufacturers, it has been considered impossible to date to provide a single tube which combines the desirable features of a length to screen diagonal ratio of less than approximately 0.60, acceptable picture quality, and deflection power requirements which are within practical limits for compact, low cost television receivers. That is, no one in the art has found a way to combine the various individual teachings of the art to provide a cathode-ray tube ideally suited for compact television receivers. One major reason for this is that the various factors that must be considered in modifying an existing cathode-ray tube configuration are so complex and interrelated that they are not susceptible to mathematical analysis or individual treatment.

Therefore it is an object of the present invention to provide a cathode-ray tube having good picture quality, relatively low deflection power requirements and an overall length to screen diagonal ratio which is substantially smaller than that of any prior art television picture tube now in commercial use.

It is an additional object of the present invention to provide an improved cathode-ray tube and beam deflection means therefor which has a minimum overall length.

It is a further object of the present invention to provide a television picture tube and deflection assembly having shorter overall length and lower deflection power requirements than prior art tubes of comparable screen size and picture quality.

Still another object of the present invention is to provide a television picture tube and beam deflection assembly which has both excellent beam focusing characteristics and relatively low beam deflection power requirements.

In general, these and other objects of the present invention are achieved by providing a cathode-ray tube having an envelope formed with a relatively short, large diameter neck region, a contiguous constricted yoke region which has an outer diameter substantially smaller than the diameter of the neck region and a flared region contiguous with the constricted yoke region. The flared region is formed with the inner surfaces thereof substantially parallel to and closely adjacent the paths of the electron beam which terminate at points on the screen of the cathode-ray tube which are most remote from the center of the screen. The preferred embodiment of the invention is provided with a compact, large aperture electrostatic acceleration lens in the neck region thereof. Further, in accordance with the invention, a deflection means is provided having first and second pairs of deflection coils. The active conductors of at least one pair of the deflection coils are in close juxtaposition with the constricted yoke region and at least a portion of the flared region.

For a better understanding of the present invention together with other and further objects thereof, reference should now be had to the following detailed description which is to be read in conjunction with the accompanying drawings in which.

Figures 1, 2, 3, 6, 8:
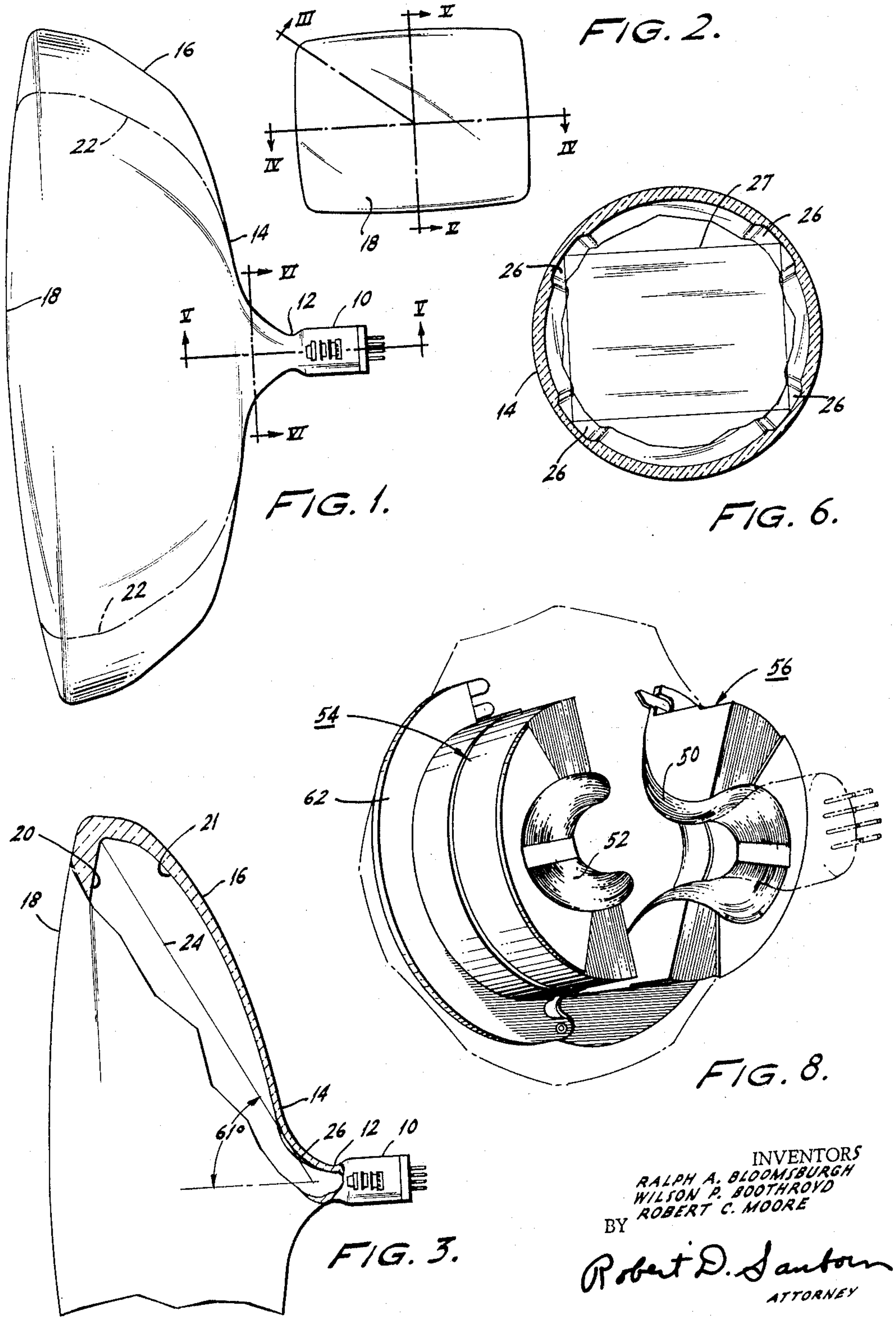
FIG. 1 is a top view of a cathode-ray tube which is formed in accordance with the teachings of the present invention.
FIG. 2 is a view showing the faceplate of the tube of FIG. 1.
FIG. 3 is a fragmentary view, partially in section, taken along the line III—III of FIG. 2.
FIG. 6 is a sectional view taken along the line VI—VI of FIG. 1.
FIG. 8 is a pictorial view of the split deflection yoke assembly in an open position.

The drawings depict a single preferred embodiment of the invention. Therefore the parts are identified by the same reference numerals throughout the several figures. The present invention is not limited in its application to any particular size of cathode-ray tube. However it is believed that the improvements afforded by the present invention can be best appreciated by making specific reference to an embodiment having an 18-inch diagonal measurement. Comparison of the dimensions and performance characteristics given for this particular embodiment with the dimensions and performance characteristics of the shortest 17-inch picture tube assembly previously available in the art will show that a substantial reduction in overall length and deflection power requirements has been achieved. The several figures of the drawing show with reasonable fidelity the actual shape of a preferred embodiment of picture tube having an 18-inch diagonal measurement. The beam deflection assembly shown in the drawing has also been drawn approximately to scale but certain minor details thereof have been omitted in order not to obscure the important features of the invention.

In the drawing, FIG. 1 is a top view of the novel cathode-ray tube which is part of the present invention. This tube has an enlarged neck portion 10, a constricted yoke region 12, and a circularly flared portion 14 which blends into the rectangular bell portion 16. The rectangular configuration of the faceplate 18 is shown in FIG. 2. Faceplate 18 carries the usual phosphor screen 20 on the interior surface thereof. Portions 14 and 16 are provided with the usual conductive anode coating 21 on their interior surfaces.

Since the portions 10, 12 and 14 are generally circular in cross-section, the side view of these portions will be the same as the top view shown in FIG. 1. The side view of the rectangular bulb portion 16 is shown by the phantom line 22 in FIG. 1.

FIG. 3 is a fragmentary view, partially in section, showing the outline of the picture tube along a diagonal of the rectangular bulb portion 16. The section is taken along line III—III of FIG. 2. Line 24 in FIG. 3 represents the maximum deflected position of the electron beam. As will be shown in detail later, the flared portion 14 of the picture tube envelope is formed with notches or grooves 26 in the interior surface thereof at positions corresponding to the corners of the rectangular raster scanned by the beam.

Figures 4, 5, 7:
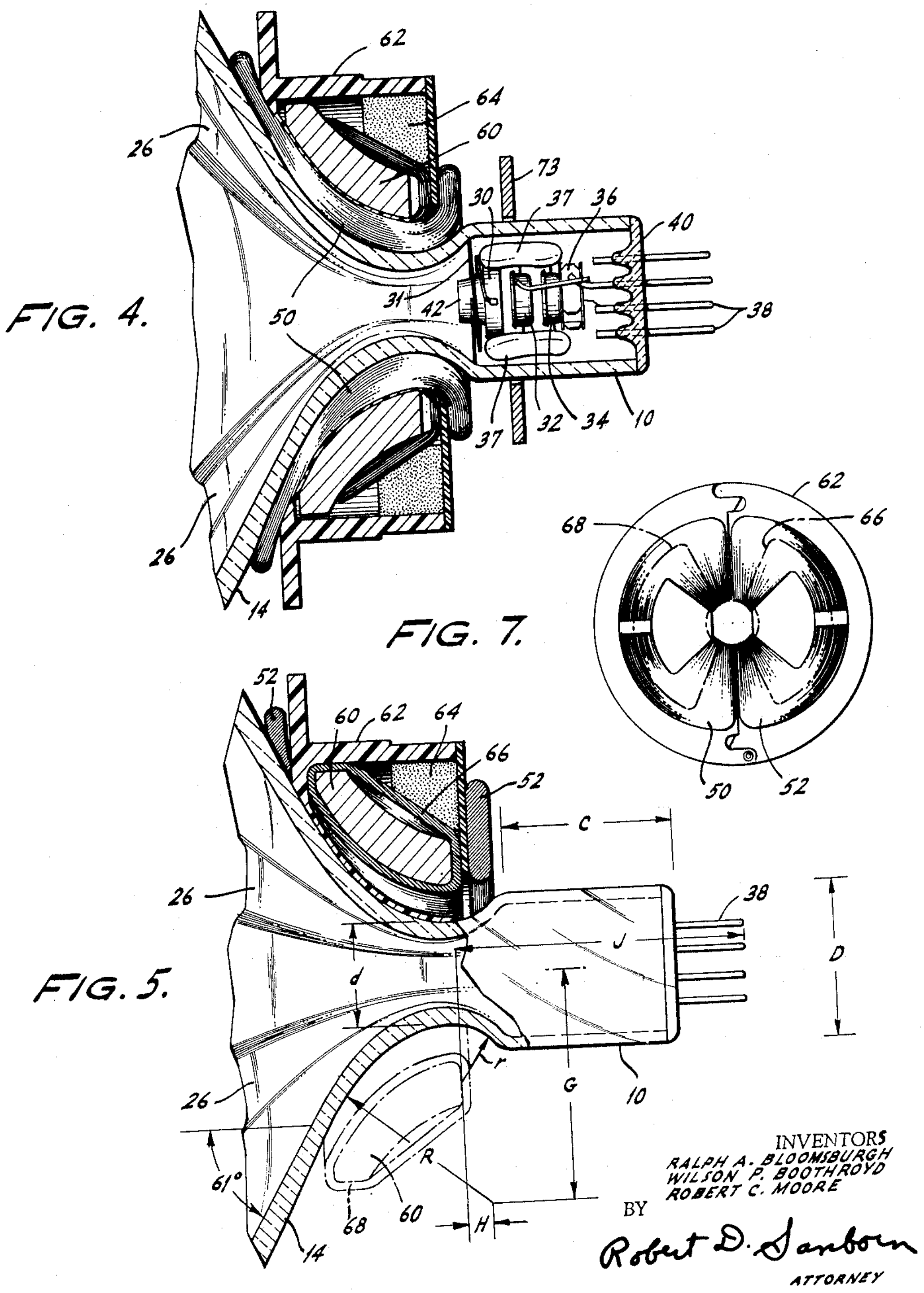
FIGS. 4 and 5 are fragmentary views showing in detail various aspects of the neck portion of the tube and the beam deflection means mounted thereon.
FIG. 7 is a simplified view of the deflection yoke assembly as viewed along the longitudinal axis from the screen end of the tube.

The preferred shape of the portions 10, 12 and 14 of the tube envelope are shown in detail in FIGS. 4, 5 and 6. FIGS. 4 and 5 are both fragmentary views of the neck region of the picture tube. FIG. 4 is a sectional view taken along the line IV—IV of FIG. 2. FIG. 5 is partially in section, this section being along the line V—V of FIGS. 1 and 2. FIG. 6 is a sectional view taken at right angles to the longitudinal axis as shown by the line VI—VI of FIG. 1. Certain of the parts and surfaces in FIG. 5 have been provided with dimension lines. One preferred embodiment of an 18-inch picture tube constructed in accordance with the present invention had the dimensions given below.

C—1¼" (approx.)
D—1⅛" OD (approx.)
*d*—¾" OD (approx.)
*r*—.300" radius
R—1.322" radius
G—1.675"
H—.213"
J—2⅛" (approx.)

It will be seen from FIG. 4 that the enlarged neck portion 10 of the picture tube envelope houses a multi-element electrostatic acceleration lens assembly which includes a high voltage anode and getter element 30, an accelerating electrode 32 and a generally cup-shaped screen grid element 34 and a cathode-control grid module 36. The elements of the electron gun assembly are held in proper position by insulating beads 37 and the various electrode leads which connect to the pins 38 passing through the glass base 40 of neck portion 10. Contact with the anode coating 21 is made by a helical spring 31 which is connected at one end to the anode element 30. The cathode-grid module 36 is described and claimed in U.S. Patent 2,905,848, issued September 22, 1959 and assigned to the assignee of the present invention. The remainder of electron gun assembly shown in FIG. 4 with the exception of the conical shield member 42 is described and claimed in the copending application of Samuel H. Borman, Serial No. 862,608, filed December 29, 1959, now abandoned. The conical shield member 42 is provided on the interior of the anode-getter ring 30 to prevent deposition of getter material on the insulating beads 37 when the getter is flashed.

The relatively large diameter D of the neck portion 10 permits the picture tube shown in the drawing to be processed on existing tube-basing machines. The large dimension D also permits the elements of the accelerating lens to be of relatively large diameter.

The accelerating lens assembly shown in FIG. 4 has several advantages in the present minimum length picture tube assembly. The overall length of the electron gun is of the order of ¾ inch which is approximately ½ inch shorter than the shortest unipotential focusing electron guns in current commercial use. It has the additional advantage that the focusing elements thereof do not have the necked-down portions found in unipotential lenses. Thus the effective diameter of the lens is very nearly equal to the maximum physical diameter of elements 32 and 34. In the preferred embodiment of the invention the diameters of the physical apertures of elements 32 and 34 are equal to approximately one half the outer diameter of the constricted neck region 12. The large effective diameter of the lens provides the improvement in focus which is made necessary by the increased deflection angle of the lens. It also minimizes any defocusing effect which may be present due to the fringing field from the deflection coils. It has the further advantage that element 32 normally operates at a potential of the order of 500 volts while anode 30 operates at a potential of the order of 16 kilovolts. As a result, there are no low potential points in the focusing field adjacent the ends of the deflection coil where the electron beam might be defocused due to its relatively low velocity. Since the type of lens employed is less susceptible to deflection defocusing than the unipotential lens now in current use and since, because of its short length, it can be located almost entirely outside the region occupied by the deflection yoke, little if any, shielding of the lens from the deflection field and centering field is required. As will be seen later, the diameter of the deflection coils is smaller for the embodiment shown in the drawing than for conventional cathode-ray tubes. This also tends to reduce the amount of fringing field from the deflection means and consequently reduces the effect of the fringing field on the beam while in the electron lens assembly. Still another advantage of the acceleration type lens over the unipotential lens is that the acceleration lens is relatively more sensitive to changes in electrode potential thus making it possible to employ dynamic focus if desired in order to improve still further the quality of the presentation on the screen 18.

The minimum diameter *d* of the constricted neck portion 12 of the tube envelope is determined largely by the size opening required to accomplish the necessary screening and coating operations on the interior of the tube. These operations are performed through the neck opening after the faceplate 18 has been joined to bell 16 and before the electron gun is inserted. The radius *r* between the enlarged neck portion 10 and the constricted neck portion 12 is provided to avoid glass strains which would result from an abrupt corner. It may be made as small as possible consistent with this consideration.

The radius R of the flared portion 14 of the picture tube element is selected together with the radius *r* so that the tube envelope conforms as closely as possible to the trajectory of the electron beam in its maximum deflected position. This occurs only at the four corners of the rectangular raster. The glass envelope is made as thin as possible at the corners of the rectangular raster in order to permit the inner dimensions of the deflection yoke to be as small as possible. Decreasing the inner dimensions of the deflection yoke increases the deflection sensitivity of the yoke. The envelope is made thicker in regions away from the diagonal in order to provide the necessary mechanical strength for the flared portion 14 of the tube envelope. As a result, the flared portion 14 is formed with what appear to be notches or grooves 26 at four regions thereof. The corners of the rectangular raster scanned by the electron beam extend into these notches 26. This is shown in detail in FIGS. 3 and 6. The shaded rectangle 27 in FIG. 6 represents the cross-section of the volume of space scanned by the electron beam.

The deflection yoke assembly for the picture tube just described is shown in FIGS. 4, 5, 7 and 8. FIG. 7 is a simplified view of the yoke assembly only looking along the longitudinal axis from the screen end of the tube. FIG. 8 is a pictorial view of the yoke in an open position. The internal diameter of the deflection yoke is smaller than the diameter D of the enlarged neck portion 10 of the picture tube. Therefore as shown in FIGS. 7 and 8, the yoke is split along a horizontal plane so that it may be fitted around the constricted neck portion 12 of the picture tube. The beam deflection means includes two saddle-shaped, horizontal deflection coils 50 and 52. An edge view of winding 50 is shown in FIG. 4. The end turns of winding 52 are shown in FIG. 5. Another view of these coils is shown in FIG. 7. The abutting edges of coils 50 and 52 correspond to the horizontal plane on which the yoke is divided. Therefore the two halves 54 and 56 of the yoke may be separated as shown in FIG. 8 without disturbing the horizontal deflection windings.

The deflection yoke is provided with the usual toroidal core 60 which is also split along the horizontal plane. Windings 50 and 52 and core 60 are held in their proper relative positions by means of an insulating housing 62 and a toroidal ring of resilient insulating material 64 which occupies a position between core 60 and housing 62.

The vertical deflection coils 66 and 68 are toroidal in shape, being wound about the core 60. The cross-section of one of the vertical deflection coils is shown at 66 in FIG. 5. The second vertical deflection coil 68 is shown in phantom in FIG. 5 in order not to interfere in the dimension lines given on this figure. Vertical deflection coils 66 and 68 do not extend across the separation between the two halves of core 60 and hence coils 66 and 68 do not interfere with the separation of the two halves 54 and 56 of the deflection yoke assembly. The position of the toroidal vertical deflection coils 66 and 68 on the core 60 is represented by the broken lines 66 and 68 in FIG. 7.

Conventional beam centering means such as the diametrically magnetized apertured disc 73 of FIG. 4 may be employed. Disc 73 is shown only diagrammatically in FIG. 4 and is omitted entirely in the other views in order not to obscure the novel features of the present invention.

The overall length of an 18-inch picture tube of the type shown in the drawing was 8⅞ inches. This is approximately 2 inches less than the shortest 17-inch 110° deflection picture tube now in use. It was found that the required 122° deflection angle required by this tube could be achieved with 20% less horizontal deflection power and 35% less vertical deflection power than a conventional 17-inch 110° deflection tube. The picture obtained was comparable to that produced on 17-inch 110° deflection tubes with respect to brightness, contrast, resolution and geometry.

As indicated above, the dimensions given herein are by way of example only and are not to be construed as limiting the invention to the particular size of tubes shown. Cathode-ray tubes having larger or smaller screen sizes preferably would have a shape similar to the ones shown in the drawings. However, in general, some change in the rate of flare of portion 14 would be desirable in order to take into account the change in beam trajectory brought about by changes in the accelerating potentials. Again it should be emphasized that the flared portion 14 is so constructed that the inner surface of the horizontal deflection coils conforms as closely as possible to and is as near as possible to the trajectory of the beam at its maximum angle of displacement as is possible. This means that the glass envelope of the cathode-ray tube must conform to the trajectory of the cathode-ray beam at the angle of maximum deflection as closely as possible. Some changes in the electrode potentials and/or geometry of the electron gun may be desirable in order to compensate for changes in focus resulting from different gun to screen distances and for increased beam current.

While there has been described what are referred to as preferred embodiments thereof, it will be apparent that various modifications and other embodiments thereof will occur to those skilled in the art within the scope of the invention. Accordingly I desire the scope of my invention to be limited only by the appended claims.

I claim:

1. In combination, a cathode-ray tube having an envelope formed with a relatively short, large diameter neck region, means for generating an electron beam and a multielement electrostatic beam focusing lens disposed within said neck region, a constricted yoke region contiguous with said neck region and immediately adjacent the end of said electrostatic lens which is remote from said beam generating means, said constricted yoke region having an outer diameter substantially smaller than the diameter of said neck region, a flared region contiguous with said constricted yoke region, and a screen spaced from said flared region, said flared region being formed with inner surfaces substantially parallel to and closely adjacent the paths of the electron beam of said tube which terminate at the points on said screen which are most remote from the center of said screen, and deflection means having first and second pairs of beam deflection coils, at least one pair of said coils having the active conductors thereof in close juxtaposition with said constricted yoke region and at least a portion of said flared region.

2. In combination, a cathode-ray tube having an envelope formed with a relatively short, large diameter neck region, means for generating an electron beam and a multielement electrostatic beam focusing lens disposed within said neck region, a constricted yoke region contiguous with said neck region and immediately adjacent the end of said electrostatic lens which is remote from said beam generating means, said constricted yoke region having an outer diameter substantially smaller than the diameter of said neck region, said yoke region having an inner diameter which is not greater than the effective outer diameter of said electrostatic lens, a flared region contiguous with said constricted yoke region, and a screen spaced from said flared region, said flared region being formed with inner surfaces substantially parallel to and closely adjacent the deflected paths of the electron beam of said tube which terminate at the points on said screen which are most remote from the center of said screen, and deflection means having first and second pairs of beam deflection coils, said first pair being saddle-shaped deflection coils, said second pair being toroidal deflection coils, the active conductors of said saddle-shaped deflection coils lying in close juxtaposition with said constricted yoke region and at least a portion of said flared region.

3. In combination, a cathode-ray tube having an envelope formed with a relatively short, large diameter neck region, means for generating an electron beam and a multielement electrostatic beam focusing lens disposed within said neck region, a constricted yoke region contiguous with said neck region and immediately adjacent the element of said electrostatic lens which is most remote from said beam generating means, said constricted yoke region having an outer diameter substantially smaller than the diameter of said neck region, said yoke region having an inner diameter which is not greater than the effective outer diameter of said electrostatic lens, a flared region contiguous with said constricted yoke region, and a rectangular screen spaced from said flared region, said flared region being formed with inner surfaces substantially parallel to and closely adjacent the paths of the electron beam of said tube which terminate at the corners of said rectangular screen, and deflection means having first and second pairs of beam deflection coils, said first pair being saddle-shaped deflection coils, said second pair being toroidal deflection coils, said saddle-shaped deflection coils being positioned to deflect the electron beam of said tube parallel to the longer edge of said rectangular screen, said toroidal deflection coils being oriented to deflect the electron beam of said tube parallel to the shorter edge of said screen, the active conductors of said saddle-shaped deflection coil being disposed in close juxtaposition with said constricted yoke region and at least a portion of said flared region.

4. In combination, a cathode-ray tube having an envelope formed with a relatively short, large diameter neck region, means for generating an electron beam and a multielement electrostatic lens disposed within said neck region, a constricted yoke region contiguous with said neck region and immediately adjacent the element of electrostatic lens which is most remote from said beam generating means, said constricted yoke region having an outer diameter substantially smaller than the diameter of said neck region, a flared region contiguous with said constricted yoke region, and a screen spaced from said flared region, said flared region being formed with inner surfaces substantially parallel to and closely adjacent the paths of the electron beam of said tube which terminate at the points on said screen which are most remote from the center of said screen, and deflection means having first and second pairs of deflection coils, at least one pair of said coils having the active conductors thereof in close juxtaposition with said constricted yoke region and at least a portion of said flared region, one deflection coil of each pair lying entirely on one side and the other deflection coil of each pair lying entirely on the other side of a plane passing through the longitudinal axis of said neck region and said contiguous yoke region, said deflection means including said first and second pairs of deflection coils being formed of two relatively movable sections which may be separated to facilitate placement of said deflection means over said constricted yoke region.

5. In combination, a cathode-ray tube having an envelope formed with a relatively short, large diameter neck region, means for generating an electron beam and a multielement electrostatic accelerating lens disposed within said neck region, a constricted yoke region contiguous with said neck region and immediately adjacent the element of said electrostatic lens which is most remote from said beam generating means, said constricted yoke region having an outer diameter substantially smaller than the diameter of said neck region, a flared region contiguous with said constricted yoke region, and a rectangular screen spaced from said flared region, the angle between the longitudinal axis of said tube passing through the center of said screen and a straight line connecting a corner of said screen with the apparent center of deflection of said tube being at least 60°, said flared region being formed with inner surfaces substantially parallel to and closely adjacent the paths of the electron beam of said tube which terminate at the corners of said rectangular screen, and deflection means having first and second pairs of beam deflection coils, one deflection coil of each pair lying entirely on one side and the other deflection coil of each pair lying entirely on the other side of a plane passing through the longitudinal axis of said neck region and said contiguous yoke region, said first pair being saddle-shaped deflection coils, said second pair being toroidal deflection coils, said saddle-shaped deflection coils being positioned to deflect the beam parallel to the longer edge of said rectangular screen, said toroidal cores being oriented to deflect the beam parallel to the shorter edge of said rectangular screen, said saddle-shaped deflection coils having the active conductors thereof in close juxtaposition with said constricted yoke region and at least a portion of said flared region.

6. In combination, a cathode-ray tube having an envelope formed with a relatively short, large diameter neck region, means for generating an electron beam and a three-element electrostatic accelerating lens disposed within said neck region, a constricted yoke region contiguous with said neck region and immediately adjacent the element of said lens which is most remote from said beam generating means, said constricted yoke region having an outer diameter substantially smaller than the diameter of said neck region, said yoke region having an inner diameter which is not greater than the effective outer diameter of said electrostatic lens, a flared region contiguous with said constricted yoke region, and a rectangular screen spaced from said flared region, the angle between the longitudinal axis of said tube passing through the center of said screen and a straight line connecting a corner of said screen with the apparent center of deflection of said tube being at least 60°, said flared region being formed with inner surfaces substantially parallel to and closely adjacent the paths of the electron beam of said tube which terminate at the corners of said rectangular screen, and deflection means having first and second pairs of beam deflection coils, one pair of said coils being saddle-shaped deflection coils, said second pair being toroidal deflection coils, said saddle-shaped deflection coils being positioned to deflect the electron beam parallel to the longer edge of said rectangular screen, said toroidal coils being oriented to deflect the electron beam parallel to the shorter edge of said screen, said saddle-shaped deflection coils having the active conductors thereof in close juxtaposition with said constricted yoke region and at least a portion of said flared region, said deflection means including said first and second pairs of deflection coils being formed of two relatively movable sections which may be separated to facilitate the placement of the assembled deflection means over said constricted yoke region, the physical aperture in the two elements of said lens closest to said screen having a diameter at least equal to approximately one-half the diameter of the smallest circle centered on the longitudinal axis of said tube which may be inscribed within said deflection coil.

7. A cathode-ray tube having an envelope formed with a relatively short, large diameter neck region, means for generating an electron beam and a multielement electrostatic beam focusing lens disposed within said neck region, a constricted yoke region contiguous with said neck region and immediately adjacent the end of said electrostatic lens which is remote from said beam generating means, said constricted yoke region having an outer diameter substantially smaller than the diameter of said neck region, said yoke region having an inner diameter not greater than the effective outer diameter of said electrostatic lens, a flared region contiguous with said constricted yoke region, and a screen spaced from said flared region, said flared region being formed with inner surfaces substantially parallel to and closely adjacent the paths of the electron beam of said tube which terminate at the points on said screen which are most remote from the center of said screen.

8. In combination, a cathode-ray tube having an envelope formed with a relatively short, large diameter neck region, means for generating an electron beam and a multielement electrostatic accelerating lens disposed within said neck region, a constricted yoke region contiguous with said neck region and immediately adjacent the end of said electrostatic lens which is remote from said beam generating means, said constricted yoke region having an outer diameter substantially smaller than the outer diameter of said neck region, a flared region contiguous with said constricted yoke region, and a rectangular screen spaced from said flared region, said flared region being formed with inner surfaces substantially parallel to and closely adjacent the paths of the electron beam of said tube which terminate at the corners of said rectangular screen, and deflection means having first and second pairs of beam deflection coils, said first pair being saddle-shaped deflection coils, said second pair being toroidal deflection coils, said saddle-shaped deflection coils having the active conductors thereof in close juxtaposition with said constricted yoke region and at least a portion of said flared region, one deflection coil of each pair lying entirely on one side and the other deflection coil of each pair lying entirely on the other side of a plane passing through the longitudinal axis of said neck region and said contiguous yoke region, said deflection means being formed of two relatively movable sections separable along said plane whereby the assembled deflection means may be readily positioned over said constricted yoke region.

9. In combination, a cathode-ray tube having an envelope formed with a relatively short, large diameter neck region, means for generating an electron beam and a three-element electrostatic accelerating lens disposed within said neck region, a constricted yoke region contiguous with said neck region and immediately adjacent the element of said lens most remote from said beam generating means, said constricted yoke region having an outer diameter substantially smaller than the outer diameter of said neck region, said yoke region having an inner diameter which is not greater than the effective outer diameter of electrostatic lens, a flared region contiguous with said constricted yoke region, a rectangular screen spaced from said flared region, the angle between the longitudinal axis of said tube passing through the center of said screen and a straight line connecting a corner of said screen with the apparent center of deflection of said tube being at least 60°, said flared region being formed with inner surface substantially parallel to and closely adjacent the paths of the electron beam of said tube which terminate at the corners of said rectangular screen, deflection means having first and second pairs of beam deflection coils, one pair of said coils being saddle-shaped deflection coils, said second pair being toroidal deflection coils, said saddle-shaped deflection coils being positioned to deflect the electron beam parallel to the longer edge of said rectangular screen, said toroidal deflection coils being oriented to deflect the electron beam parallel to the shorter edge of said screen, said saddle-shaped deflection coils having the active conductors thereof in close juxtaposition with said constricted yoke region and at least a portion of said flared region, one deflection coil of each pair lying entirely on one side and the other deflection coil of each pair lying entirely on the other side of a plane passing through said longitudinal axis, said deflection means including said deflection coils being formed of two relatively movable sections which may be separated to facilitate the placement of the assembled deflection means over said constricted yoke region, the physical aperture in the two elements of said lens closest to said screen having a diameter at least equal to approximately one half the diameter of the smallest circle centered on the longitudinal axis of said tube which may be inscribed within said deflection coil.

References Cited in the file of this patent

UNITED STATES PATENTS

| | | |
|---|---|---|
| 2,099,749 | Orth | Nov. 23, 1937 |
| 2,236,498 | Blain | Apr. 1, 1941 |
| 2,294,123 | Miller et al. | Aug. 25, 1942 |
| 2,781,475 | Fyler | Feb. 12, 1957 |
| 2,840,740 | Bickford | June 24, 1958 |
| 2,852,712 | Fabel | Sept. 16, 1958 |
| 2,931,932 | Haigh et al. | Apr. 5, 1960 |
| 2,935,635 | Boothroyd | May 3, 1960 |
| 2,971,118 | Brudick | Feb. 7, 1961 |
| 3,027,479 | Benway | Mar. 27, 1962 |

FOREIGN PATENTS

| | | |
|---|---|---|
| 403,671 | Great Britain | May 9, 1933 |
| 946,249 | Germany | July 26, 1956 |